(12) United States Patent
Wong et al.

(10) Patent No.: US 11,061,906 B2
(45) Date of Patent: Jul. 13, 2021

(54) JOIN OPERATIONS FOR HIERARCHICAL DIMENSIONS

(71) Applicant: SAP SE, Walldorf (DE)

(72) Inventors: Justin Wong, Burnaby (CA); Clarence Chuahuico, Port Coquitlam (CA); Veljko Jovanovic, Vancouver (CA)

(73) Assignee: SAP SE, Walldorf (DE)

( * ) Notice: Subject to any disclaimer, the term of this patent is extended or adjusted under 35 U.S.C. 154(b) by 292 days.

(21) Appl. No.: 16/124,156

(22) Filed: Sep. 6, 2018

(65) Prior Publication Data
US 2020/0082008 A1 Mar. 12, 2020

(51) Int. Cl.
*G06F 16/2455* (2019.01)
*G06F 16/28* (2019.01)
*G06F 16/22* (2019.01)

(52) U.S. Cl.
CPC ...... *G06F 16/2456* (2019.01); *G06F 16/2246* (2019.01); *G06F 16/282* (2019.01)

(58) Field of Classification Search
None
See application file for complete search history.

(56) References Cited

U.S. PATENT DOCUMENTS

| | | | | |
|---|---|---|---|---|
| 2009/0013287 A1* | 1/2009 | Helfman | ................. | G06F 3/048 715/853 |
| 2010/0131457 A1* | 5/2010 | Heimendinger | ...... | G06F 16/283 707/602 |
| 2014/0372365 A1* | 12/2014 | Weyerhaeuser | ...... | G06F 16/283 707/602 |
| 2015/0193531 A1* | 7/2015 | Mandelstein | ......... | G06F 16/288 707/794 |
| 2016/0306869 A1* | 10/2016 | Weller | .................. | G06F 16/282 |

OTHER PUBLICATIONS

Datawarehouse Concepts. "Dimension Hierarchies in OBIEE:Level-Based Hierarchy and Parent-Child Hierarchy". Published Aug. 2, 2012. URL Link: <http://dwhlaureate.blogspot.com/2012/08/dimension-hierarchies-in-obiee_2.html>. Accessed Aug. 2020. (Year: 2012).*
Oracle. Oracle Fusion Middleware User's Guide for Oracle Business Intelligence Enterprise Edition 12.2.1.2.0. Published Dec. 2016. URL Link: <https://docs.oracle.com/middleware/12212/biee/BIEUG/BIEUG.pdf>. Accessed Aug. 2020. (Year: 2016).*

* cited by examiner

*Primary Examiner* — Irene Baker
(74) *Attorney, Agent, or Firm* — Fountainhead Law Group P.C.

(57) ABSTRACT

Some embodiments provide a non-transitory machine-readable medium that stores a program. The program receives from a client device a request for data stored in a database categorized based on a hierarchical dimension. The hierarchical dimension is configured to store values from a plurality of values organized in a hierarchy comprising a plurality of levels. The program further generates an intermediary data structure by combining a first set of the data stored in the database and a second set of data based on a level in the hierarchy. The program also generates results for the request by aggregating the data in the intermediary data structure based on the level in the hierarchy. The program further provides the results for the request to the client device.

18 Claims, 12 Drawing Sheets

| Country | Province/State | City | Sales ($M) | Sales Threshold |
|---|---|---|---|---|
| Canada | <null> | <null> | 70 | High |
| Canada | British Columbia | <null> | 30 | High |
| Canada | British Columbia | Vancouver | 10 | Low |
| Canada | British Columbia | Burnaby | 20 | High |
| Canada | Ontario | <null> | 40 | High |
| Canada | Ontario | Toronto | 40 | High |
| US | <null> | <null> | 60 | High |
| US | Oregon | <null> | 50 | High |
| US | Oregon | Portland | 25 | High |
| US | Oregon | Bend | 25 | High |
| US | Washington | <null> | 10 | Low |
| US | Washington | Vancouver | 10 | Low |

200

| Region ID | Region |
|---|---|
| 1 | Canada |
| 2 | United States |
| 3 | British Columbia |
| 4 | Ontario |
| 5 | Oregon |
| 6 | Washington |
| 7 | Bend |
| 8 | Burnaby |
| 9 | Portland |
| 10 | Toronto |
| 11 | Vancouver |
| 12 | Vancouver |

| Hierarchy ID | Region ID | Parent |
|---|---|---|
| A | 1 | <null> |
| B | 2 | <null> |
| C | 3 | 1 |
| D | 4 | 1 |
| E | 5 | 2 |
| F | 6 | 2 |
| G | 7 | 5 |
| H | 8 | 3 |
| I | 9 | 5 |
| J | 10 | 4 |
| K | 11 | 3 |
| L | 12 | 6 |

| Region ID | Sales ($M) |
|---|---|
| 1 | 70 |
| 3 | 30 |
| 11 | 10 |
| 8 | 20 |
| 4 | 40 |
| 10 | 40 |
| 2 | 60 |
| 5 | 50 |
| 9 | 25 |
| 7 | 25 |
| 6 | 10 |
| 12 | 10 |

405 — Region ID
410 — Sales ($M)

| Region Hierarchy ID | Sales Threshold |
|---|---|
| G | High |
| H | High |
| I | High |
| J | High |
| K | Low |
| L | Low |

505 — Region Hierarchy ID
510 — Sales Threshold

| Region Hierarchy ID | Region ID | Sales ($M) |
|---|---|---|
| A | 1 | 70 |
| C | 3 | 30 |
| K | 11 | 10 |
| H | 8 | 20 |
| D | 4 | 40 |
| J | 10 | 40 |
| B | 2 | 60 |
| E | 5 | 50 |
| I | 9 | 25 |
| G | 7 | 25 |
| F | 6 | 10 |
| L | 12 | 10 |

| Region Hierarchy ID | Region ID | Sales ($M) | Sales Threshold |
|---|---|---|---|
| K | 11 | 10 | High |
| H | 8 | 20 | High |
| J | 10 | 40 | High |
| I | 9 | 25 | High |
| G | 7 | 25 | Low |
| L | 12 | 10 | Low |

| Country | Province/State | City | Sales ($M) |
|---|---|---|---|
| CA | <null> | <null> | 70 |
| CA | BC | <null> | 30 |
| CA | BC | Vancouver | 10 |
| CA | BC | Burnaby | 20 |
| CA | ON | <null> | 40 |
| CA | ON | Toronto | 40 |
| US | <null> | <null> | 60 |
| US | OR | <null> | 50 |
| US | OR | Portland | 25 |
| US | OR | Bend | 25 |
| US | WA | <null> | 10 |
| US | WA | Vancouver | 10 |

| Country | Province/State | City | Sales Threshold |
|---|---|---|---|
| CA | BC | Vancouver | Low |
| CA | BC | Burnaby | Low |
| CA | ON | Toronto | High |
| US | OR | Portland | High |
| US | OR | Bend | High |
| US | WA | Vancouver | Low |

| Country (1205) | Province/State (1210) | City (1215) | Sales ($M) (1220) | Sales Threshold (1225) |
|---|---|---|---|---|
| CA | BC | Vancouver | 10 | Low |
| CA | BC | Burnaby | 20 | High |
| CA | ON | Toronto | 40 | High |
| US | OR | Portland | 25 | High |
| US | OR | Bend | 25 | High |
| US | WA | Vancouver | 10 | Low |

| Country (1305) | Province/State (1310) | City (1315) | Sales ($M) (1320) | Sales Threshold (1325) |
|---|---|---|---|---|
| Canada | <null> | <null> | 70 | High |
| Canada | British Columbia | <null> | 30 | High |
| Canada | British Columbia | Vancouver | 10 | Low |
| Canada | British Columbia | Burnaby | 20 | High |
| Canada | Ontario | <null> | 40 | High |
| Canada | Ontario | Toronto | 40 | High |
| US | <null> | <null> | 60 | High |
| US | Oregon | <null> | 50 | High |
| US | Oregon | Portland | 25 | High |
| US | Oregon | Bend | 25 | High |
| US | Washington | <null> | 10 | Low |
| US | Washington | Vancouver | 10 | Low |

FIG. 13

JOIN OPERATIONS FOR HIERARCHICAL DIMENSIONS

BACKGROUND

Databases are one or many ways of managing and storing data in computing systems. Some databases can be defined to include different tables. Each table may have one or more columns. A row of data in a table can have a value stored in one or more of the columns. Queries may be performed on tables in databases. For example, a table may be queried for records that contain specific values in one or more fields of the table. In some cases, a column in a table can be configured to stored values calculated based on values in other columns of the table. For instance, a table may have a first column for storing a quantity of a product sold, a second column for storing a unit price of the product, and a third column configured to store the total amount sold (i.e., the product of the quantity and the unit price). This allows an additional field of data on which queries can be made. As another example, queries can be performed on multiple tables in databases. For instance, multiple tables can be joined together using common fields in the tables.

SUMMARY

In some embodiments, a non-transitory machine-readable medium stores a program. The program receives from a client device a request for data stored in a database categorized based on a hierarchical dimension. The hierarchical dimension is configured to store values from a plurality of values organized in a hierarchy comprising a plurality of levels. The program further generates an intermediary data structure by combining a first set of the data stored in the database and a second set of data based on a level in the hierarchy. The program also generates results for the request by aggregating the data in the intermediary data structure based on the level in the hierarchy. The program further provides the results for the request to the client device.

In some embodiments, the hierarchy may be implemented as a parent-child hierarchy. The program may further determine the level in the hierarchy by identifying the lowest level in the hierarchy and using the identified level as the level in the hierarchy. The hierarchy may be implemented as a level-based hierarchy. The program may also receive a selection of the level in the hierarchy from the user of the client device.

In some embodiments, the request for data stored in the database may be categorized further based on a calculated dimension. The second set of data may include the calculated dimension. The program may further generate the calculated dimension based on a subset of the data stored in the database.

In some embodiments, a method, performed by a device, receives from a client device a request for data stored in a database categorized based on a hierarchical dimension. The hierarchical dimension is configured to store values from a plurality of values organized in a hierarchy comprising a plurality of levels. The method further generates an intermediary data structure by combining a first set of the data stored in the database and a second set of data based on a level in the hierarchy. The method also generates results for the request by aggregating the data in the intermediary data structure based on the level in the hierarchy. The method further provides the results for the request to the client device.

In some embodiments, the hierarchy may be implemented as a parent-child hierarchy. The method may further determine the level in the hierarchy by identifying the lowest level in the hierarchy and using the identified level as the level in the hierarchy. The hierarchy may be implemented as a level-based hierarchy. The method may also receive a selection of the level in the hierarchy from the user of the client device.

In some embodiments, the request for data stored in the database may be categorized further based on a calculated dimension. The second set of data may include the calculated dimension. The method may further generate the calculated dimension based on a subset of the data stored in the database.

In some embodiments, a system includes a set of processing units and a non-transitory machine-readable medium that stores instruction. The instructions cause at least one processing unit to receive from a client device a request for data stored in a database categorized based on a hierarchical dimension. The hierarchical dimension is configured to store values from a plurality of values organized in a hierarchy comprising a plurality of levels. The instructions further cause the at least one processing unit to generate an intermediary data structure by combining a first set of the data stored in the database and a second set of data based on a level in the hierarchy. The instructions also cause the at least one processing unit to generate results for the request by aggregating the data in the intermediary data structure based on the level in the hierarchy. The instructions further cause the at least one processing unit to provide the results for the request to the client device.

In some embodiments, the hierarchy may be implemented as a parent-child hierarchy. The instructions may further cause the at least one processing unit to determine the level in the hierarchy by identifying the lowest level in the hierarchy and using the identified level as the level in the hierarchy. The hierarchy may be implemented as a level-based hierarchy. The instructions may also cause the at least one processing unit to receive a selection of the level in the hierarchy from the user of the client device.

In some embodiments, the request for data stored in the database may be categorized further based on a calculated dimension. The second set of data may include the calculated dimension. The instructions may further cause the at least one processing unit to generate the calculated dimension based on a subset of the data stored in the database.

The following detailed description and accompanying drawings provide a better understanding of the nature and advantages of the present invention.

BRIEF DESCRIPTION OF THE DRAWINGS

FIG. 2 illustrates an example table of regions according to some embodiments.

FIG. 3 illustrates an example parent-child hierarchy definition of the regions illustrated in FIG. 2 according to some embodiments.

FIG. 4 illustrates an example table of data that includes a hierarchical dimension according to some embodiments.

FIG. 5 illustrates a calculated dimension created based on a measure in the table illustrated in FIG. 4 according to some embodiments.

FIG. 6 illustrates a table that includes hierarchy IDs from the table illustrated in FIG. 3 with the data from the table illustrated in FIG. 4 according to some embodiments.

FIG. 7 illustrates a table generated by combining the tables illustrated in FIGS. 5 and 6 according to some embodiments.

FIG. 10 illustrates an example table of data that includes a hierarchical dimension according to some embodiments.

FIG. 11 illustrates a calculated dimension created based on a measure in the table illustrated in FIG. 10 according to some embodiments.

FIG. 12 illustrates a table generated by combining the tables illustrated in FIGS. 10 and 11 according to some embodiments.

FIG. 13 illustrates a table of results for a request according to some embodiments.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for performing join operations on hierarchical dimensions. In some embodiments, a system includes a database and a query processor. The database can store hierarchical dimensions. However, the query processor does not support join operations on the hierarchical dimensions. In some such embodiments, the system includes a query generator that is capable of achieving join operations on hierarchical dimensions stored in the database even though the query processor cannot perform join operations on hierarchical dimensions. In some embodiments, a hierarchical dimension may store values from a plurality of values that are organized in a hierarchy. The hierarchy can include a plurality of levels. In some embodiments, the query generator performs join operations on the hierarchical dimension by determining a level in the hierarchy and then generating a query that performs a join operation on the hierarchical dimension based on the determined level in the hierarchy.

The techniques described in the present application provide a number of benefits and advantages over conventional join operations. For instance, join operations can be performed on hierarchical dimensions for systems with databases and query processors that do not support join operations on hierarchical dimensions. The techniques provide this capability without the need to modify such databases or query processors.

Figure 1:
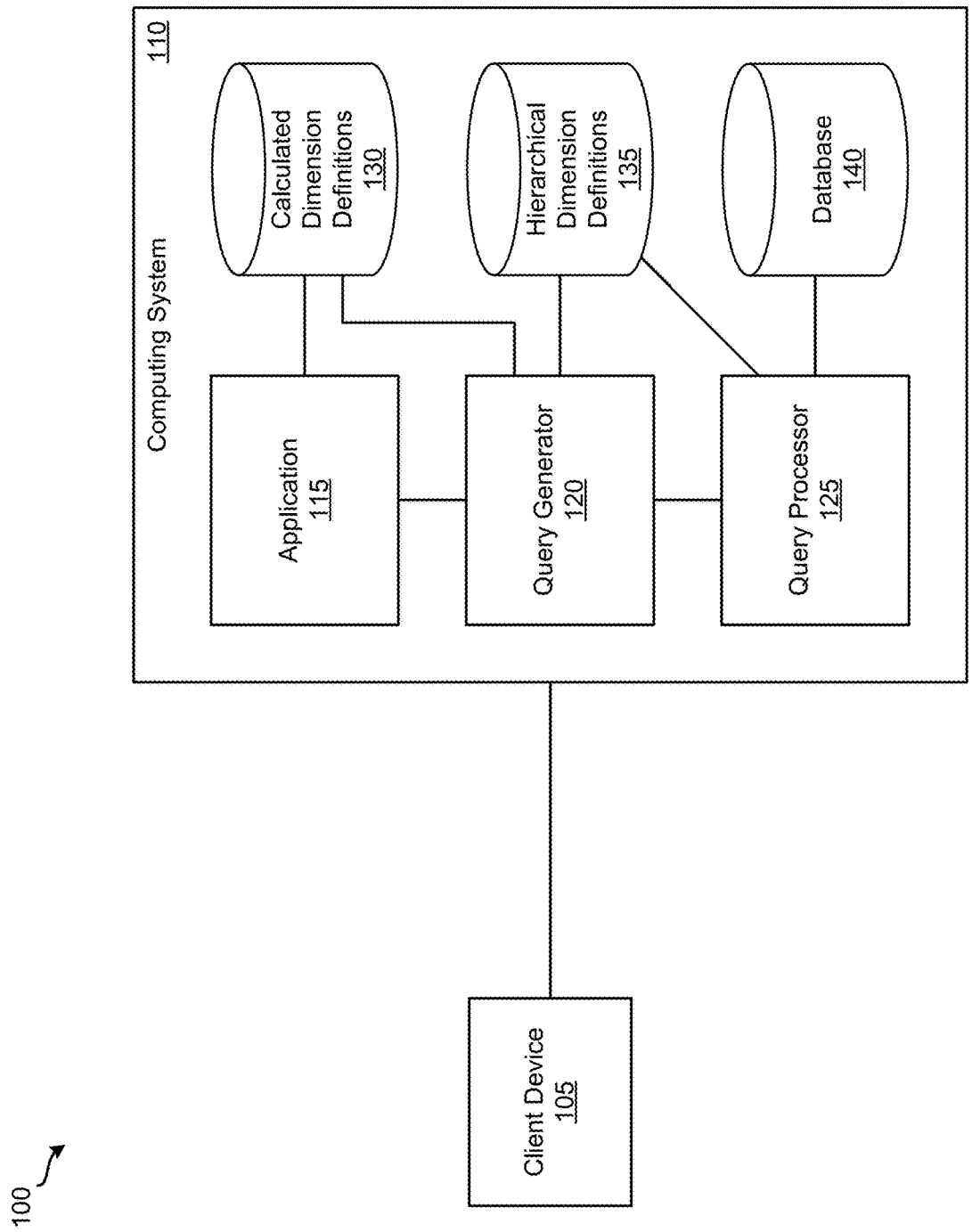
FIG. 1 illustrates a system for performing join operations according to some embodiments.

FIG. 1 illustrates a system 100 for performing join operations according to some embodiments. As shown, system 100 includes client device 105 and computer system 110. While FIG. 1 shows one client device 105, one of ordinary skill in the art will appreciate that any number of additional client devices configured similarly to client device 105 may be included in system 100.

Client device 105 is configured to communicate and interact with computer system 110. For example, a user of client device 105 may send computing system 110 a request for data stored in database 140 that is categorized based on a hierarchical dimension. The request can be also for data from a calculated dimension. In some cases, the request for such data includes a request for a visualization of the data. In response to the request, client device 105 may receive the requested data (or a visualization of the requested data) from computing system 110. Client device 105 can display the requested data on a display of client device 105 and/or further process the requested data.

Additionally, a user of client device 105 may create calculated dimension definitions that define calculated dimensions, which computing system 110 may utilize to categorize data stored in database 140. In some embodiments, the user of client device 105 uses a tool for creating calculated dimension definitions that is provided by computing system 110. In some embodiments, a calculated dimension definition specifies a unique identifier (e.g., a name) for the calculated dimension, a set of fields in a database (e.g., database 140), and a set of operations for deriving values from the values in the set of fields for the calculated dimension. After specifying a calculated dimension definition, the user of client device 105 sends the calculated dimension definition to computing system 110. In addition, the user of client device 105 may use the tool to edit or delete existing calculated dimension definitions.

As illustrated in FIG. 1, computing system 110 includes application 115, query generator 120, query processor 125, calculated dimension definitions storage 130, hierarchical dimension definitions storage 135, and database 140. In some embodiments, a database management system (DBMS) provides access to and interacts with hierarchical dimension definitions storage 135 and/or database 140. In some such embodiments, query processor 125 is implemented as part of the DBMS. In some embodiments, calculated dimension definitions storage 130 and hierarchical dimension definitions storage 135 are part of database 140. Calculated dimension definitions storage 130 is configured to stores calculated dimension definitions. Hierarchical dimension definitions storage 135 is configured to stores hierarchical dimension definitions. In some embodiments, a hierarchical dimension definition specifies a plurality of values organized in a hierarchy. The hierarchy can include a plurality of levels. Different types of hierarchies may be defined by a hierarchical dimension definition. For example, a hierarchical dimension definition can define the hierarchy as a parent-child hierarchy. As another example, a hierarchical dimension definition can define the hierarchy as a level-based hierarchy.

Database 140 stores data that includes hierarchical dimensions defined by hierarchical dimension definitions, which are stored in hierarchical dimension definitions storage 135. In some embodiments, the data in database 140 is stored in one or more tables. Each table can include a plurality of fields. Each table can have one or more records that stores a value in each field in the plurality of fields. The plurality of fields may include one or more measures and one or more dimensions. In some embodiments, a measure is a field that is configured to store quantitative (e.g., numeric) data whereas a dimension is a field that is configured to store qualitative data. Values stored in a measure can be referred to as measure values and values stored in dimensions can be referred to as dimension values. In some embodiments, a dimension is configured to categorize measures based on the dimension values of the dimension. In some embodiments, calculated dimension definitions storage 130, hierarchical dimension definitions storage 135, and database 130 are implemented in a single physical storage while, in other embodiments, calculated dimension definitions storage 130, hierarchical dimension definitions storage 135, and database 140 may be implemented across several physical storages. While FIG. 1 shows calculated dimension definitions storage 130, hierarchical dimension definitions storage 135, and database 140 as part of computing system 110, one of ordinary skill in the art will appreciate that calculated dimension definitions storage 130, hierarchical dimension definitions storage 135, and/or database 130 may be external to computing system 110 in some embodiments.

Application 115 is configured to communicate and interact with client device 105. For example, application 115 may receive from client device 105 a request for data stored in database 140 that is categorized based on a hierarchical dimension. The request may be further for data from a calculated dimension. In response to such a request, application 115 forwards the request to query generator 120. In some instances when the hierarchical dimension definition associated with the hierarchical dimension specifies a level-based hierarchy, application 115 may also receive a selection of a level in the hierarchy of the level-based hierarchy. In such instances, application 115 also forwards the selection of the level in the hierarchy to query generator 120. Upon receiving the results for the request from query generator 120, application 115 provides the results for the request to client device 105. Application 115 may be any number of different types of applications. For instance, application 115 may be an analytics application, a data management application, a database management application, a human capital management application, an enterprise management application, a customer relationship management application, a financial management application, etc.

In addition, application 115 can provide client device 105 a tool for creating calculated dimension definitions. Through the tool, application 115 can receive from client device 105 a calculated dimension definition, which application 115 then stores in calculated dimension definitions storage 130. Application 115 can also receive edits to calculated dimension definitions or commands to delete calculated dimension definitions from client device 105 via the tool.

Query generator 120 is responsible for generating queries for data from database 140 and queries for performing join operations on hierarchical dimensions. For example, query generator 120 can receive from application 115 a request for data stored in database 140 that is categorized based on a hierarchical dimension. In response, query generator 120 accesses hierarchical dimension definitions storage 135 to retrieve the hierarchical dimension definition associated with the hierarchical dimension. Query generator 120 then determines a level in the hierarchy specified in the hierarchical dimension definition. In some embodiments, when the hierarchical dimension definition specifies a parent-child hierarchy, query generator 120 determines the level by identifying the lowest level in the hierarchy and using the identified level as the determined level in the hierarchy. In some embodiments, when the hierarchical dimension definition specifies a level-based hierarchy, query generator 120 also receives a selection of a level in the hierarchy from application 115, which query generator 120 uses as the determined level in the hierarchy. Next, query generator 120 generates a query for combining a first set of data stored in database 140 and a second set of data stored in database 140 based on the determined level in the hierarchy. The first set of data and the second set of data can each include the hierarchical dimension. In some instances, the request that query generator 120 receives can be also for data from a calculated dimension. In such instances, query generator 120 accesses calculated dimension definitions storage 130 to retrieve the calculated dimension definition associated with the calculated dimension and generates a query for generating the calculated dimension based on the calculated dimension definition. The calculated dimension can be part of the first set of data or the second set of data. Then, query generator 120 sends the generated queries to query processor 125 for execution. When query generator 120 receives the results for the queries from query processor 125, query generator 120 sends the results for the queries to application 115.

Query processor 125 handles processing of queries. For instance, query processor 125 may receive from query generator 120 a query for combining a first set of data stored in database 140 and a second set of data stored in database 140, which each includes a hierarchical dimension, based on a level in a hierarchy specified in a hierarchical dimension definition associated with the hierarchical dimension. In some cases, query processor 125 also receives from query generator 120 a query for data in a calculated dimension. The calculated dimension can be part of the first set of data or the second set of data. In such cases, query processor 125 processes the query for generating the calculated dimension and incorporates it into the first or second set of data accordingly. Query processor 125 processes the query by retrieving the first and second sets of data from database 140. Query processor 125 then combines the first set of data with the set of data based on the determined level in the hierarchy, performs an aggregation operation on the combined results, sends the aggregated results to query generator 120. In cases where data from a calculated dimension specified in the query, query processor 125 destroys the calculated dimension.

An example operation of system 100 will now be described by reference to FIGS. 1-8. FIG. 2 illustrates an example table 200 of regions according to some embodiments. As shown, table 200 includes fields 205 and 210. Field 205 is configured to store a unique identifier (ID) associated with a region and field 210 is configured to store a name of the region. Table 200 includes a region named "Canada" with a region ID of 1, a region named "United States" with a region ID of 2, a region named "British Columbia" with a region ID of 3, a region named "Ontario" with a region ID of 4, a region named "Oregon" with a region ID of 5, a region named "Washington" with a region ID of 6, a region named "Bend" with a region ID of 7, a region named "Burnaby" with a region ID of 8, a region named "Portland" with a region ID of 9, a region named "Toronto" with a region ID of 10, a region named "Vancouver" with a region ID of 11, and a region named "Vancouver" with a region ID of 12.

FIG. 3 illustrates an example parent-child hierarchy definition of the regions illustrated in FIG. 2 according to some embodiments. Specifically, FIG. 3 illustrates a table 300 that includes a fields 305-315. Field 305 is configured to store a unique ID associated with a parent-child relationship. Field 310 is configured to store a region ID associated with a region from table 200. Field 315 is configured to store a region ID associated with a region from table 200 that is the parent of the region specified in field 310. According to table 300, the regions "Canada" and "United States" do not have a parent, as indicated by a "<null>" value specified in field 315. The region "Canada" is the parent region of the regions "British Columbia" and "Ontario". The region "British Columbia" is the parent region of the regions "Burnaby" and "Vancouver". The region "Ontario" is the parent region of the region "Toronto". The region "United States" is the parent region of the regions "Oregon" and "Washington". The region "Oregon is the parent region of the regions "Bend" and "Portland". The region "Washington" is the parent region of the region "Vancouver". In this example, the parent-child hierarchy defined by table 300 is stored in hierarchical dimension definitions storage 135. FIG. 4 illustrates an example table 400 of data that includes a hierarchical dimension according to some embodiments. For this example, the data shown in table 400 of FIG. 4 will be used as the data stored in database 140. As illustrated, table 400 includes fields 405 and 410. Field 405 is defined as a hierarchical dimension that is configured to store a region ID. Field 410 is a measure that stores sales values in terms of numbers that represent millions of dollars ($M).

The example operation starts by client device 105 sending application 115 a request for a visualization of sales values from table 400 categorized based on the hierarchical dimension illustrated in FIG. 4 (i.e., field 405) as well as data from a calculated dimension. For the calculated dimension, a user of client device 105 has specified a measure-based calculated dimension as the type of calculated dimension and "Sales Threshold" as the name of the calculated dimension. For a measure-based calculated dimension, a user may specify properties and, optionally, a filter context for the measure-based calculated dimension. The properties can include a measure, several member names and a range of values associated with member name, and a dimension context. In some embodiments, a dimension context specifies one or more dimensions to use for a combination operation. A filter context may include a dimension and a dimension value that are used as a filter on the calculated dimension.

In this example, the user of client device 105 has specified the Sales measure in table 400 as the measure for the measure-based calculated dimension. The user of client device 105 has also specified two member names: "High" and "Low." A ranges of less than twenty million has been specified for the "Low" member name. A ranges of greater than or equal to twenty million has been specified for the "High" member name. The user of client device 105 has additionally specified, via input control 1355, a dimension context property that includes the Region ID dimension in table 400. When application 115 receives the request from client device 105, application 115 forwards the request to query generator 120.

Once query generator 120 receives the request from application 115, query generator 120 accesses hierarchical dimension definitions storage 135 to retrieve the hierarchical dimension definition associated with the hierarchical dimension (i.e., table 300). Query generator 120 then determines a level in the hierarchy specified in the hierarchical dimension definition, which is the hierarchy defined by hierarchy definition 300 in this example. Query generator 120 determines the level by identifying the lowest level in the hierarchy and using the identified level as the determined level in the hierarchy. Query generator 120 then generates a query for generating a calculated dimension based on the measure-based calculated dimension defined above and the determined level in the hierarchy. In addition, the query combines the generated calculated dimension with the data in table 400 based on the determined level in the hierarchy.

Next, query generator 120 sends the generated query to query processor 125 for execution.

After query generator 125 receives the query from query generator 120, query processor 125 processes the query by executing the query. Executing the query for this example causes query processor 125 to identify the lowest-level region IDs in the hierarchy defined by table 300, which are region IDs 7-12 in this example; identify the records in table 400 that have region IDs included in the identified lowest-level region IDs; iterate through the Sales measure of the identified records; and generate, for each record, a dimension value for the calculated dimension that is associated with the record by determining a member name specified in the properties of the calculated dimension defined above based on the value of the Sales measure of the record. For this example, if the value of the Sales measure of a record is less than twenty million, the dimension value for the calculated dimension that is associated with the record is determined to be "Low". If the value of the Sales measure of a record is greater than or equal to twenty million, the dimension value for the calculated dimension that is associated with the record is determined to be "High". Query generator 120 also includes the hierarchy ID associated with the region IDs illustrated in table 300 along with the calculated dimension.

FIG. 5 illustrates a calculated dimension created based on a measure in the table illustrated in FIG. 4 according to some embodiments. Specifically, FIG. 5 illustrates a table 500 that includes fields 505 and 510. Field 505 is the hierarchy ID dimension (i.e., field 305) from table 300. Field 510 is the calculated dimension. As shown, only records in table 400 that have a region ID in the Region ID dimension that belongs to the lowest-level in the hierarchy defined by table 300 are included in table 500. The corresponding hierarchy IDs of such records are included in field 505. Also, for each of such records, the value in field 510 is generated by determining a member name as specified in the calculated dimension defined above based on the value of the Sales measure of the record and the ranges of values associated with the member names.

Continuing with the example, query processor 125 then combines the calculated dimension with data in table 400 based on the determined level in the hierarchy. In particular, query processor 125 retrieves the data from table 400 and includes the hierarchy IDs from table 300 that correspond to the region IDs in field 405. FIG. 6 illustrates a table that includes the hierarchy IDs from table 300 with the data in table 400 according to some embodiments. Specifically, query processor 125 generates table 600 by retrieving the data from table 400 and including the hierarchy IDs from table 300 that correspond to the region IDs in field 405. As shown, table 600 includes fields 605-615. Field 605 is configured to store a hierarchy ID associated with the region ID in field 610. Fields 610 and 615 are the same as fields 405 and 410, respectively.

Returning to the example, query processor 125 proceeds to combine the calculated dimension and data in table 400 into an intermediary data structure (e.g., a table). In this example, query processor 125 combines the calculated dimension and data in table 400 by performing a join operation on the hierarchy ID field in the calculated dimension and the hierarchy ID field added to the data retrieved from table 400. That is, the join operation identifies records in the data retrieved from table 400 where the value in the hierarchy ID field included in the data retrieved from table 400 is equal to the value in the hierarchy ID field in table 300.

FIG. 7 illustrates a table 700 generated by combining the tables illustrated in FIGS. 5 and 6 according to some embodiments. In particular, query processor 125 generates table 700 in the manner described above (i.e., by performing a join operation on the hierarchy ID field in the calculated dimension and the hierarchy ID field added to the data retrieved from table 400). As illustrated in FIG. 7, table 700 includes fields 705-720. Field 705 is configured to store a hierarchy ID associated with a region ID. Field 710 is a hierarchical dimension that is configured to store a region ID. Field 715 is a measure that stores sales values in terms of numbers that represent millions of dollars ($M). Field 720 is a calculated dimension generated from the calculated dimension defined above and configured to store values based on the calculated dimension defined above. For this example, table 700 is an intermediary table that query processor 125 generates by performing a join operation of the calculated dimension and data in table 400. The records shown in table 700 are the results of the join operation.

After combining the calculated dimension and data in table 400, query processor 125 further processes the intermediary table by iterating through the hierarchy defined in table 300 to identify ancestor regions of regions in the intermediary table that are included in table 400, retrieving data from table 400 for the identified ancestor regions, and determining a value for the calculated dimension for the identified ancestor regions. Next, query processor 125 performs an aggregation operation on the intermediary data structure by aggregating sales values of records that have the same value in the hierarchy ID dimension. After completing the aggregation operation, query processor 125 generates results for the request by generating a table that includes the aggregated sales values and the dimension values in the calculated dimension. In this example, query processor 125 identifies the region name associated with the region ID, as shown in table 200, and includes the region names instead of the region IDs in the results for the request. Query processor 125 then sends the results for the request to query generator 120, which forwards it application 115. When application 115 receives the results for the request, application 115 generates a visualization based on the results for the request. Application 115 then provides the visualization to client device 105.

Figure 8:
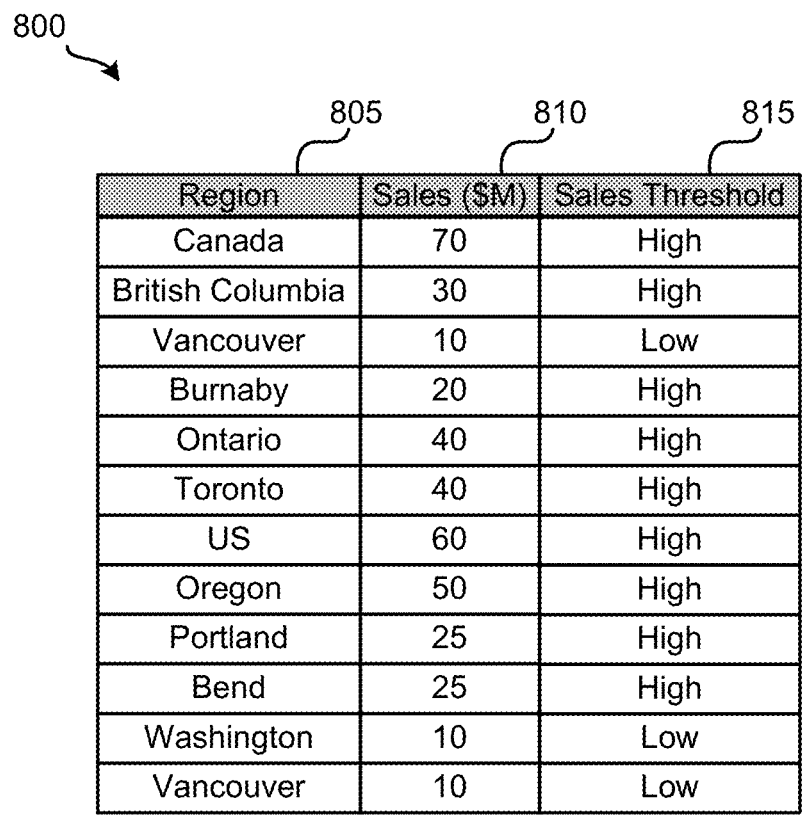
FIG. 8 illustrates a table of results for a request according to some embodiments.

FIG. 8 illustrates a table 800 of results for a request according to some embodiments. Specifically, table 800 is generated by query processor 125 as the results for the request for this example. As illustrated, table 800 includes fields 805-815. Field 805 is configured to store a name of a region from table 200 that is associated with a region ID in table 400. Field 810 is configured to store a sales value from field 405 associated with the region. Field 815 is configured to store a value for the calculated dimension based on the calculated dimension defined above.

Figure 9:
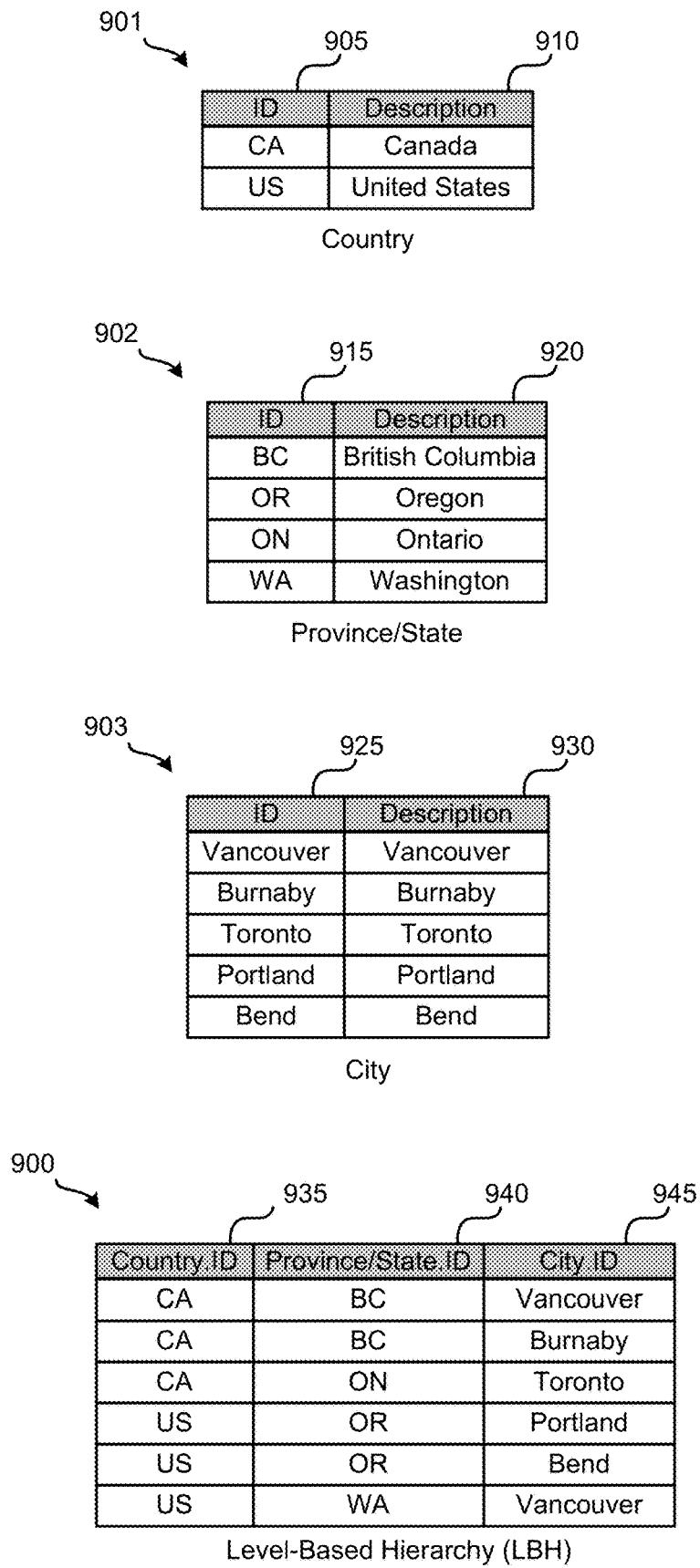
FIG. 9 illustrates an example level-based hierarchy definition according to some embodiments.

Another example operation of system 100 will now be described by reference to FIGS. 1 and 9-12. FIG. 9 illustrates an example level-based hierarchy (LBH) definition according to some embodiments. As illustrated, FIG. 9 shows dimensions 901-903. Dimension 901, which is a Country dimension, includes fields 905 and 910. Field 905 stores a unique identifier for a country and field 910 stores a description (e.g., name) of the country. Dimension 902 is a Province/State dimension, which includes fields 915 and 920. Field 915 stores a unique identifier for a province or state and field 920 stores a description (e.g., name) of the province or state. Dimension 903, which is a City dimension, includes fields 925 and 930. Field 925 stores a unique identifier for a city and field 930 stores a description (e.g., name) of the city. Further, FIG. 9 illustrates table 900, which defines a level-based hierarchy. Table 900 includes fields 935-345. Field 935 stores a unique identifier for a country, field 340 stores a unique identifier for a province or state, and field 945 stores a unique identifier for a city. In addition, field 935 stores identifiers that represent nodes in a first, top-most level in the hierarchy, field 940 stores identifiers that represent nodes in a second level in the hierarchy, and field 945 stores identifiers that represent nodes in a third, bottom-most level in the hierarchy. In this example, the level-based hierarchy defined by table 900 is stored in hierarchical dimension definitions storage 135. FIG. 10 illustrates an example table 1000 of data that includes a hierarchical dimension according to some embodiments. For this example, table 1000 will be used as the data stored in database 140. As shown, table 1000 includes fields 1005-1020. Fields 1005-1015 are collectively specified as a hierarchical dimension defined based on table 900. Field 1005 is configured to store a Country ID, field 1010 is configured to store a Province/State ID, and field 1015 is configured to store a City ID. Field 1020 is a measure that stores sales values in terms of numbers that represent millions of dollars ($M).

The example operation begins by client device 105 sending application 115 a request for a visualization of sales values from table 1000 categorized based on the hierarchical dimension in table 1000 (i.e., fields 1005-1015) and data from a calculated dimension. In this example, a user of client device 105 specified the same calculated dimension as the one used in the example operation described above. The user of client device 115 also sends application 115 a selection of the first level in the hierarchy defined by table 900. Upon receiving the request and the selected level from client device 105, application 115 forwards them to query generator 120.

Upon receiving the request and selected level in the hierarchy from application 115, query generator 120 accesses hierarchical dimension definitions storage 135 to retrieve the hierarchical dimension definition associated with the hierarchical dimension (i.e., table 900). Next, query generator 120 then determines a level in the hierarchy specified in the hierarchical dimension definition. For this example, query generator 120 determines that the selected level in the hierarchy is the determined level. Query generator 120 then generates a query for generating a calculated dimension based on the measure-based calculated dimension defined above and the determined level in the hierarchy. Additionally, the query generated by query generator 120 combines the generated calculated dimension with the data in table 1000 based on the determined level in the hierarchy. Then, query generator 120 sends the generated query to query processor 125 for execution.

Once query processor 125 receives the query from query generator 120, query processor 125 processes the query by executing the query. In this example, executing the query causes query processor 125 to identify the lowest-level in the hierarchy defined by table 900 (i.e., the combination of values specified in fields 935-945); identify the records in table 1000 having values in fields 1005-1015 that are included in the identified lowest-level in the hierarchy; iterate through the Sales measure of the identified records; and generate, for each record, a dimension value for the calculated dimension that is associated with the record by determining a member name specified in the properties of the calculated dimension defined above based on the value of the Sales measure of the record. If the value of the Sales measure of a record is less than twenty million, the dimension value for the calculated dimension that is associated with the record is determined to be "Low". If the value of the Sales measure of a record is greater than or equal to twenty million, the dimension value for the calculated dimension that is associated with the record is determined to be "High". Query generator 120 also includes fields 1005-1015 in table 1000 with the calculated dimension.

FIG. 11 illustrates a calculated dimension created based on a measure in the table illustrated in FIG. 10 according to some embodiments. In particular, FIG. 11 illustrates a table 1100 that includes fields 1105-1120. Field 1105 is the Country ID field (i.e., field 1005) from table 1000, field 1110 is the Province/State ID field (i.e., field 1010) from table 1000, and field 1115 is the City ID field (i.e., field 1015) from table 1000. Field 1120 is the calculated dimension. As illustrated in FIG. 11, only records in table 1000 that have the same combination of values in the Country ID, Province/State ID, and City ID fields as the combination of values in fields 935-945 of table 900 are included in table 1100. For each of such records, the value in field 1120 is generated by determining a member name as specified in the calculated dimension defined above based on the value of the Sales measure of the record and the ranges of values associated with the member names.

Returning to the example, query processor 125 then combines the calculated dimension and data in table 1000 into an intermediary data structure (e.g., a table). For this example, query processor 125 combines the calculated dimension and data in table 1000 by performing a join operation on the Country ID, Province/State ID, and City ID fields in the calculated dimension and the Country ID, Province/State ID, and City ID fields in table 1000. That is, the join operation identifies records in table 1000 where the value in the Country ID field is equal to the value in the Country ID field in table 1100, the value in the Province/State ID field is equal to the value in the Province/State ID field in table 1100, and the value in the City ID field is equal to the value in the City ID field in table 1100.

FIG. 12 illustrates a table 1200 generated by combining the tables illustrated in FIGS. 10 and 11 according to some embodiments. Specifically, query processor 125 generates table 1200 in the manner described above (i.e., by performing a join operation on the Country ID, Province/State ID, and City ID dimensions in the calculated dimension and the Country ID, Province/State ID, and City ID fields in table 1000). As shown in FIG. 12, table 1200 includes fields 1205-1225. Field 1205 is configured to store a Country ID, field 1210 is configured to store a Province/State ID, and field 1215 is configured to store a City ID. Field 1220 is a measure that stores sales values in terms of numbers that represent millions of dollars ($M). Field 1225 is a calculated dimension generated from the calculated dimension defined above and configured to store values based on the calculated dimension defined above. In this example, table 1200 is an intermediary table that query processor 125 generates by performing a join operation of the calculated dimension and data in table 1000. The records illustrated in table 1200 are the results of the join operation.

Once query processor 125 combines the calculated dimension and data in table 1000, query processor 125 further processes the intermediary table by iterating through the levels in the hierarchy defined in table 900 to identify ancestor regions of regions in the intermediary table that are included in table 1000, retrieving data from table 1000 for the identified ancestor regions, and determining a value for the calculated dimension for the identified ancestor regions. Query processor 125 then performs an aggregation operation on the intermediary data structure by aggregating sales values of records that have the same value in the Country ID, Province/State ID, and City ID fields. Once the aggregation operation is finished, query processor 125 generates results for the request by generating a table that includes the aggregated sales values and the dimension values in the calculated dimension. In this example, query processor 125 identifies the Country names associated with the Country IDs, the Province/State names associated with the Province/State IDs, and the City names associated with the City IDs, and includes these names instead of the IDs in the results for the request. Next, query processor 125 sends the results for the request to query generator 120. In response, query generator 120 forwards the results for the request application 115. Upon receiving the results for the request, application 115 generates a visualization based on the results for the request. Application 115 then provides the visualization to client device 105.

FIG. 13 illustrates a table of results for a request according to some embodiments. In particular, table 1300 is generated by query processor 125 as the results for the request for this example. As shown in FIG. 13, table 1300 includes fields 1305-1325. Field 1305 is configured to store a name of a Country from table 900 that is associated with a Country ID in table 1000, field 1310 is configured to store a name of a Province/State from table 900 that is associated with a Province/State ID in table 1000, and field 1315 is configured to store a name of a City from table 900 that is associated with a City ID in table 1000. Field 1320 is configured to store a sales value from field 1010 associated with the Country, Province/State, and/or City. Field 1325 is configured to store a value for the calculated dimension based on the calculated dimension defined above.

Figure 14:
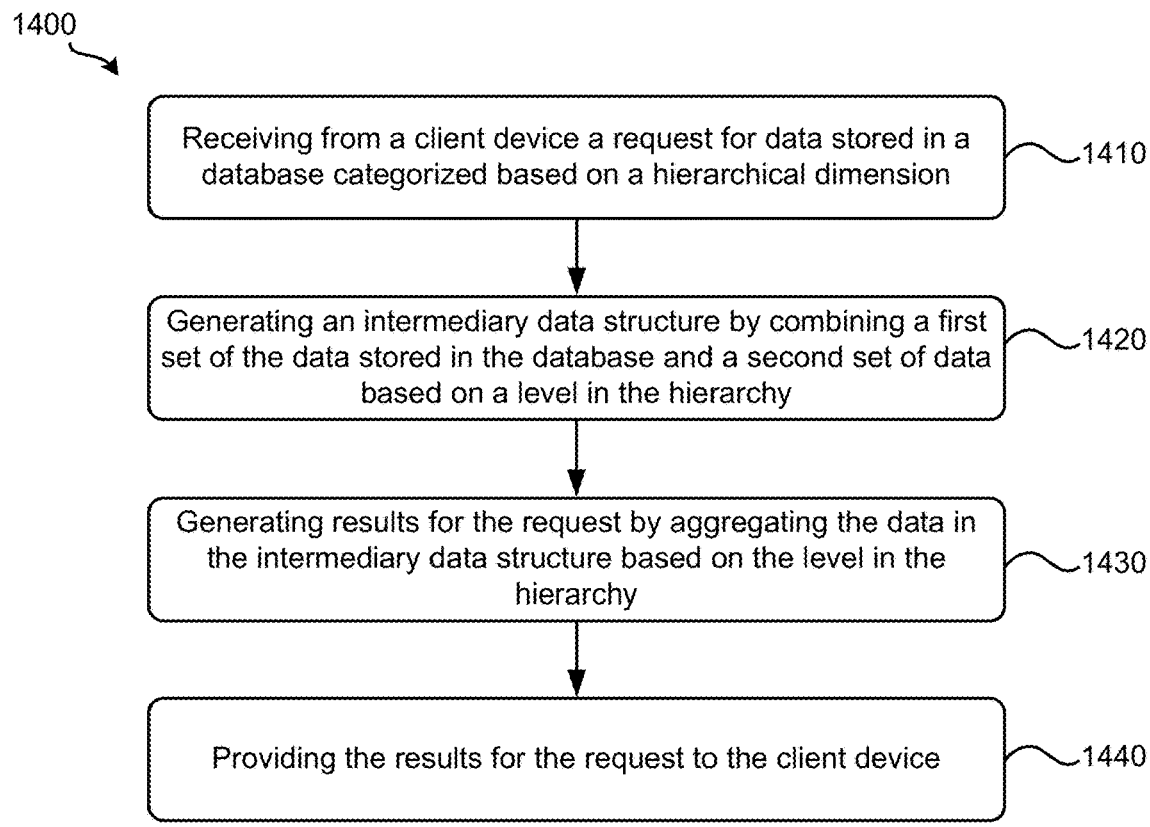
FIG. 14 illustrates a process for performing join operations according to some embodiments.

FIG. 14 illustrates a process 1400 for performing join operations according to some embodiments. In some embodiments, computing system 110 performs process 1400. Process 1400 starts by receiving, at 1410, from a client device a request for data stored in a database categorized based on a hierarchical dimension. The hierarchical dimension can be configured to store values from a plurality of values organized in a hierarchy. The hierarchy can include a plurality of levels.

Next, process 1400 generates, at 1420, an intermediary data structure by combining a first set of the data stored in the database and a second set of data based on a level in the hierarchy. Process 1400 then generates, 1430, results for the request by aggregating the data in the intermediary data structure based on the level in the hierarchy. Finally, process 1400 provides, at 1440, the results for the request to the client device.

Figure 15:
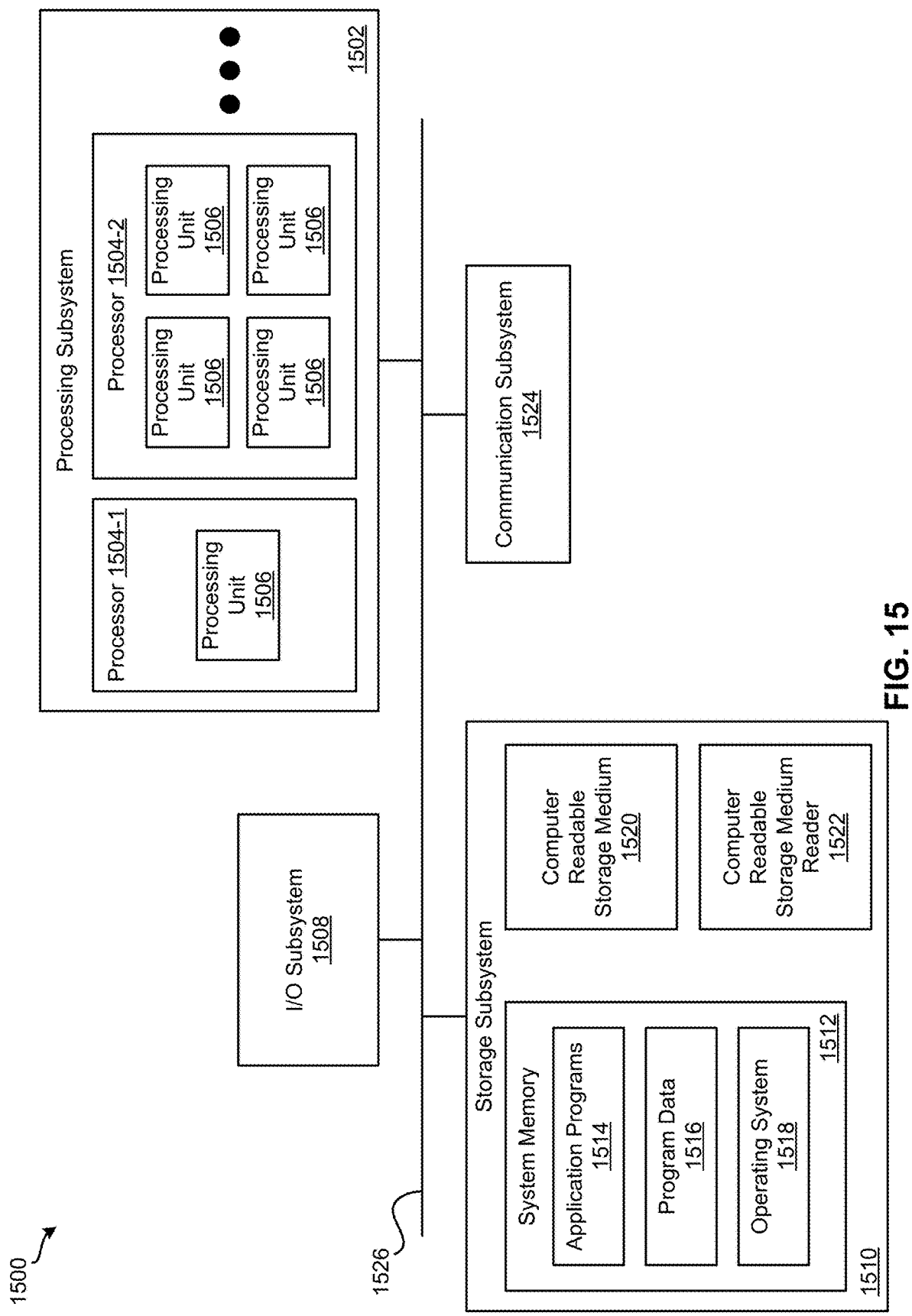
FIG. 15 illustrates an exemplary computer system, in which various embodiments may be implemented.

FIG. 15 illustrates an exemplary computer system 1500 for implementing various embodiments described above. For example, computer system 1500 may be used to implement client device 105 and computing system 110. Computer system 1500 may be a desktop computer, a laptop, a server computer, or any other type of computer system or combination thereof. Some or all elements of application 115, query generator 120, query processor 125, or combinations thereof can be included or implemented in computer system 1500. In addition, computer system 1500 can implement many of the operations, methods, and/or processes described above (e.g., process 1400). As shown in FIG. 15, computer system 1500 includes processing subsystem 1502, which communicates, via bus subsystem 1526, with input/output (I/O) subsystem 1508, storage subsystem 1510 and communication subsystem 1524.

Bus subsystem 1526 is configured to facilitate communication among the various components and subsystems of computer system 1500. While bus subsystem 1526 is illustrated in FIG. 15 as a single bus, one of ordinary skill in the art will understand that bus subsystem 1526 may be implemented as multiple buses. Bus subsystem 1526 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 1502, which can be implemented as one or more integrated circuits (e.g., a conventional microprocessor or microcontroller), controls the operation of computer system 1500. Processing subsystem 1502 may include one or more processors 1504. Each processor 1504 may include one processing unit 1506 (e.g., a single core processor such as processor 1504-1) or several processing units 1506 (e.g., a multicore processor such as processor 1504-2). In some embodiments, processors 1504 of processing subsystem 1502 may be implemented as independent processors while, in other embodiments, processors 1504 of processing subsystem 1502 may be implemented as multiple processors integrate into a single chip or multiple chips. Still, in some embodiments, processors 1504 of processing subsystem 1502 may be implemented as a combination of independent processors and multiple processors integrated into a single chip or multiple chips.

In some embodiments, processing subsystem 1502 can execute a variety of programs or processes in response to program code and can maintain multiple concurrently executing programs or processes. At any given time, some or all of the program code to be executed can reside in processing subsystem 1502 and/or in storage subsystem 1510. Through suitable programming, processing subsystem 1502 can provide various functionalities, such as the functionalities described above by reference to process 1400, etc.

I/O subsystem 608 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 1500 to a user or another device (e.g., a printer).

As illustrated in FIG. 15, storage subsystem 1510 includes system memory 1512, computer-readable storage medium 1520, and computer-readable storage medium reader 1522. System memory 1512 may be configured to store software in the form of program instructions that are loadable and executable by processing subsystem 1502 as well as data generated during the execution of program instructions. In some embodiments, system memory 1512 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 1512 may include different types of memory, such as static random access memory (SRAM) and/or dynamic random access memory (DRAM). System memory 1512 may include a basic input/output system (BIOS), in some embodiments, that is configured to store basic routines to facilitate transferring information between elements within computer system 1500 (e.g., during start-up). Such a BIOS may be stored in ROM (e.g., a ROM chip), flash memory, or any other type of memory that may be configured to store the BIOS.

As shown in FIG. 15, system memory 1512 includes application programs 1514 (e.g., application 115), program data 1516, and operating system (OS) 1518. OS 1518 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 1520 may be a non-transitory computer-readable medium configured to store software (e.g., programs, code modules, data constructs, instructions, etc.). Many of the components (e.g., application 115, query generator 120, and query processor 125) and/or processes (e.g., process 1400) described above may be implemented as software that when executed by a processor or processing unit (e.g., a processor or processing unit of processing subsystem 1502) performs the operations of such components and/or processes. Storage subsystem 1510 may also store data used for, or generated during, the execution of the software.

Storage subsystem 1510 may also include computer-readable storage medium reader 1522 that is configured to communicate with computer-readable storage medium 1520. Together and, optionally, in combination with system memory 1512, computer-readable storage medium 1520 may comprehensively represent remote, local, fixed, and/or removable storage devices plus storage media for temporarily and/or more permanently containing, storing, transmitting, and retrieving computer-readable information.

Computer-readable storage medium 1520 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 1524 serves as an interface for receiving data from, and transmitting data to, other devices, computer systems, and networks. For example, communication subsystem 1524 may allow computer system 1500 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 1524 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 1524 may provide components configured for wired communication (e.g., Ethernet) in addition to or instead of components configured for wireless communication.

One of ordinary skill in the art will realize that the architecture shown in FIG. 15 is only an example architecture of computer system 1500, and that computer system 1500 may have additional or fewer components than shown, or a different configuration of components. The various components shown in FIG. 15 may be implemented in hardware, software, firmware or any combination thereof, including one or more signal processing and/or application specific integrated circuits.

Figure 16:
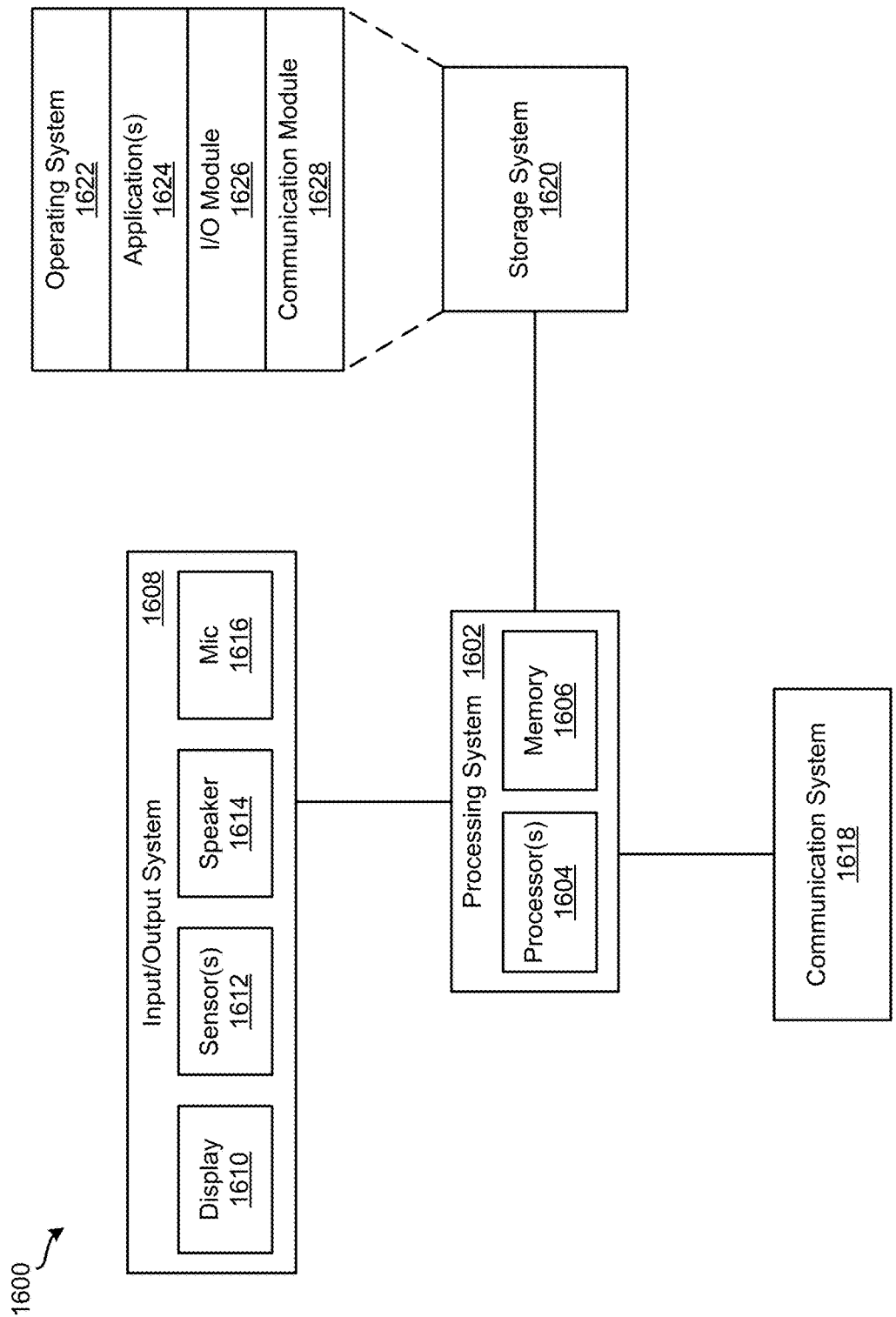
FIG. 16 illustrates an exemplary computing device, in which various embodiments may be implemented.

FIG. 16 illustrates an exemplary computing device 1600 for implementing various embodiments described above. For example, computing device 1600 may be used to implement client device 105. Computing device 1600 may be a cellphone, a smartphone, a wearable device, an activity tracker or manager, a tablet, a personal digital assistant (PDA), a media player, or any other type of mobile computing device or combination thereof. As shown in FIG. 16, computing device 1600 includes processing system 1602, input/output (I/O) system 1608, communication system 1618, and storage system 1620. These components may be coupled by one or more communication buses or signal lines.

Processing system 1602, which can be implemented as one or more integrated circuits (e.g., a conventional microprocessor or microcontroller), controls the operation of computing device 1600. As shown, processing system 1602 includes one or more processors 1604 and memory 1606. Processors 1604 are configured to run or execute various software and/or sets of instructions stored in memory 1606 to perform various functions for computing device 1600 and to process data.

Each processor of processors 1604 may include one processing unit (e.g., a single core processor) or several processing units (e.g., a multicore processor). In some embodiments, processors 1604 of processing system 1602 may be implemented as independent processors while, in other embodiments, processors 1604 of processing system 1602 may be implemented as multiple processors integrate into a single chip. Still, in some embodiments, processors 1604 of processing system 1602 may be implemented as a combination of independent processors and multiple processors integrated into a single chip.

Memory 1606 may be configured to receive and store software (e.g., operating system 1622, applications 1624, I/O module 1626, communication module 1628, etc. from storage system 1620) in the form of program instructions that are loadable and executable by processors 1604 as well as data generated during the execution of program instructions. In some embodiments, memory 1606 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 1608 is responsible for receiving input through various components and providing output through various components. As shown for this example, I/O system 1608 includes display 1610, one or more sensors 1612, speaker 1614, and microphone 1616. Display 1610 is configured to output visual information (e.g., a graphical user interface (GUI) generated and/or rendered by processors 1604). In some embodiments, display 1610 is a touch screen that is configured to also receive touch-based input. Display 1610 may be implemented using liquid crystal display (LCD) technology, light-emitting diode (LED) technology, organic LED (OLED) technology, organic electro luminescence (OEL) technology, or any other type of display technologies. Sensors 1612 may include any number of different types of sensors for measuring a physical quantity (e.g., temperature, force, pressure, acceleration, orientation, light, radiation, etc.). Speaker 1614 is configured to output audio information and microphone 1616 is configured to receive audio input. One of ordinary skill in the art will appreciate that I/O system 1608 may include any number of additional, fewer, and/or different components. For instance, I/O system 1608 may include a keypad or keyboard for receiving input, a port for transmitting data, receiving data and/or power, and/or communicating with another device or component, an image capture component for capturing photos and/or videos, etc.

Communication system 1618 serves as an interface for receiving data from, and transmitting data to, other devices, computer systems, and networks. For example, communication system 1618 may allow computing device 1600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 1618 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/ or other components. In some embodiments, communication system 1618 may provide components configured for wired communication (e.g., Ethernet) in addition to or instead of components configured for wireless communication.

Storage system 1620 handles the storage and management of data for computing device 1600. Storage system 1620 may be implemented by one or more non-transitory machine-readable mediums that are configured to store software (e.g., programs, code modules, data constructs, instructions, etc.) and store data used for, or generated during, the execution of the software.

In this example, storage system 1620 includes operating system 1622, one or more applications 1624, I/O module 1626, and communication module 1628. Operating system 1622 includes various procedures, sets of instructions, software components and/or drivers for controlling and managing general system tasks (e.g., memory management, storage device control, power management, etc.) and facilitates communication between various hardware and software components. Operating system 1622 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 1624 can include any number of different applications installed on computing device 1600. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 1626 manages information received via input components (e.g., display 1610, sensors 1612, and microphone 1616) and information to be outputted via output components (e.g., display 1610 and speaker 1614). Communication module 1628 facilitates communication with other devices via communication system 1618 and includes various software components for handling data received from communication system 1618.

One of ordinary skill in the art will realize that the architecture shown in FIG. 16 is only an example architecture of computing device 1600, and that computing device 1600 may have additional or fewer components than shown, or a different configuration of components. The various components shown in FIG. 16 may be implemented in hardware, software, firmware or any combination thereof, including one or more signal processing and/or application specific integrated circuits.

Figure 17:
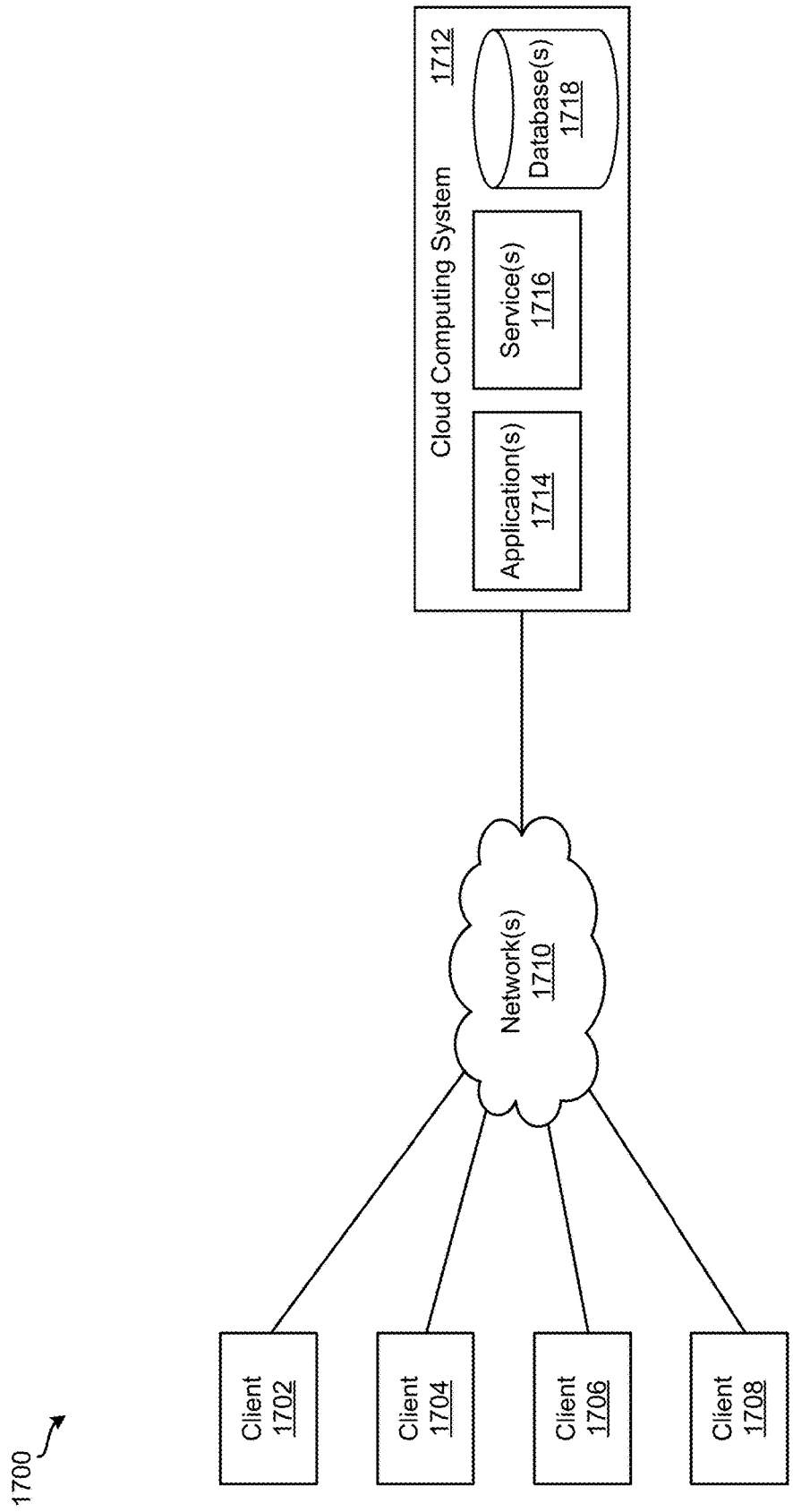
FIG. 17 illustrates system for implementing various embodiments described above.

FIG. 17 illustrates an exemplary system 1700 for implementing various embodiments described above. For example, one of client devices 1702-1708 may be used to implement client device 105 and cloud computing system 1712 of system 1700 may be used to implement computing system 110. As shown, system 1700 includes client devices 1702-1708, one or more networks 1710, and cloud computing system 1712. Cloud computing system 1712 is configured to provide resources and data to client devices 1702-1708 via networks 1710. In some embodiments, cloud computing system 1700 provides resources to any number of different users (e.g., customers, tenants, organizations, etc.). Cloud computing system 1712 may be implemented by one or more computer systems (e.g., servers), virtual machines operating on a computer system, or a combination thereof.

As shown, cloud computing system 1712 includes one or more applications 1714, one or more services 1716, and one or more databases 1718. Cloud computing system 1700 may provide applications 1714, services 1716, and databases 1718 to any number of different customers in a self-service, subscription-based, elastically scalable, reliable, highly available, and secure manner.

In some embodiments, cloud computing system 1700 may be adapted to automatically provision, manage, and track a customer's subscriptions to services offered by cloud computing system 1700. Cloud computing system 1700 may provide cloud services via different deployment models. For example, cloud services may be provided under a public cloud model in which cloud computing system 1700 is owned by an organization selling cloud services and the cloud services are made available to the general public or different industry enterprises. As another example, cloud services may be provided under a private cloud model in which cloud computing system 1700 is operated solely for a single organization and may provide cloud services for one or more entities within the organization. The cloud services may also be provided under a community cloud model in which cloud computing system 1700 and the cloud services provided by cloud computing system 1700 are shared by several organizations in a related community. The cloud services may also be provided under a hybrid cloud model, which is a combination of two or more of the aforementioned different models.

In some instances, any one of applications 1714, services 1716, and databases 1718 made available to client devices 1702-1708 via networks 1710 from cloud computing system 1700 is referred to as a "cloud service." Typically, servers and systems that make up cloud computing system 1700 are different from the on-premises servers and systems of a customer. For example, cloud computing system 1700 may host an application and a user of one of client devices 1702-1708 may order and use the application via networks 1710.

Applications 1714 may include software applications that are configured to execute on cloud computing system 1712 (e.g., a computer system or a virtual machine operating on a computer system) and be accessed, controlled, managed, etc. via client devices 1702-1708. In some embodiments, applications 1714 may include server applications and/or mid-tier applications (e.g., HTTP (hypertext transport protocol) server applications, FTP (file transfer protocol) server applications, CGI (common gateway interface) server applications, JAVA server applications, etc.). Services 1716 are software components, modules, application, etc. that are configured to execute on cloud computing system 1712 and provide functionalities to client devices 1702-1708 via networks 1710. Services 1716 may be web-based services or on-demand cloud services.

Databases 1718 are configured to store and/or manage data that is accessed by applications 1714, services 1716, and/or client devices 1702-1708. For instance, storage 130, storage 135, and database 140 may be stored in databases 1718. Databases 1718 may reside on a non-transitory storage medium local to (and/or resident in) cloud computing system 1712, in a storage-area network (SAN), on a non-transitory storage medium local located remotely from cloud computing system 1712. In some embodiments, databases 1718 may include relational databases that are managed by a relational database management system (RDBMS). Databases 1718 may be a column-oriented databases, row-oriented databases, or a combination thereof. In some embodiments, some or all of databases 1718 are in-memory databases. That is, in some such embodiments, data for databases 1718 are stored and managed in memory (e.g., random access memory (RAM)).

Client devices 1702-1708 are configured to execute and operate a client application (e.g., a web browser, a proprietary client application, etc.) that communicates with applications 1714, services 1716, and/or databases 1718 via networks 1710. This way, client devices 1702-1708 may access the various functionalities provided by applications 1714, services 1716, and databases 1718 while applications 1714, services 1716, and databases 1718 are operating (e.g., hosted) on cloud computing system 1700. Client devices 1702-1708 may be computer system 1500 or computing device 1600, as described above by reference to FIGS. 15 and 16, respectively. Although system 1700 is shown with four client devices, any number of client devices may be supported.

Networks 1710 may be any type of network configured to facilitate data communications among client devices 1702-1708 and cloud computing system 1712 using any of a variety of network protocols. Networks 1710 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
receiving from a client device a request for data stored in a database in a first table categorized based on a hierarchical dimension, wherein the hierarchical dimension is configured to store values from a plurality of values organized in a hierarchy comprising a plurality of levels specified in a second table, wherein:
the request includes a measure-based calculated dimension, and
the measure-based calculated dimension includes member names and value ranges associated with the member names;
determining a level in the hierarchy based on the request;
identifying records in the first table and the second table based on the determined level in the hierarchy;
determining first member names for measures of the identified records using the value ranges;
storing the first member names in a third table;
generating a fourth table by joining first data from the first table and the third table based on the determined level in the hierarchy;
identifying ancestor regions of regions in the fourth table that are in the database using the second table, wherein the ancestor regions are in a level of hierarchy above the determined level in the hierarchy;
retrieving data from the first table for associated with the identified ancestor regions;
aggregating measures in the fourth table according to the identified ancestor regions;
determining second member names for the aggregated measures using the value ranges;
storing the second member names and the aggregated measures in a fifth table with second associated hierarchical dimension data;
generating a sixth table by joining second data from the first table and the fifth table based on the determined level in the hierarchy; and
providing the sixth table as a result for the request to the client device.

2. The non-transitory machine-readable medium of claim 1, wherein the hierarchy is implemented as a parent-child hierarchy.

3. The non-transitory machine-readable medium of claim 2, wherein the program further comprises a set of instructions for determining the level in the hierarchy by identifying a lowest level in the hierarchy and using the identified lowest level as the determined level in the hierarchy.

4. The non-transitory machine-readable medium of claim 1, wherein the hierarchy is implemented as a level-based hierarchy.

5. The non-transitory machine-readable medium of claim 4, wherein the program further comprises a set of instructions for receiving a selection of a level in the hierarchy from a user of the client device, wherein the selection from the user is used for the determining the level in the hierarchy.

6. The non-transitory machine-readable medium of claim 1, wherein the program further comprises a set of instructions for generating the measure-based calculated dimension based on a subset of the data stored in the database.

7. A method, performed by a device, comprising:
receiving from a client device a request for data stored in a database in a first table categorized based on a hierarchical dimension, wherein the hierarchical dimension is configured to store values from a plurality of values organized in a hierarchy comprising a plurality of levels specified in a second table, wherein:
the request includes a measure-based calculated dimension, and
the measure-based calculated dimension includes member names and value ranges associated with the member names;
determining a level in the hierarchy based on the request;
identifying records in the first table and the second table based on the determined level in the hierarchy;
determining first member names for measures of the identified records using the value ranges;
storing the first member names in a third table;
generating a fourth table by joining first data from the first table and the third table based on the determined level in the hierarchy;
identifying ancestor regions of regions in the fourth table that are in the database using the second table, wherein the ancestor regions are in a level of hierarchy above the determined level in the hierarchy;
retrieving data from the first table associated with the identified ancestor regions;
aggregating measures in the fourth table according to the identified ancestor regions;
determining second member names for the aggregated measures using the value ranges;
storing the second member names and the aggregated measures in a fifth table with second associated hierarchical dimension data;
generating a sixth table by joining second data from the first table and the fifth table based on the determined level in the hierarchy; and
providing the sixth table as a result for the request to the client device.

8. The method of claim 7, wherein the hierarchy is implemented as a parent-child hierarchy.

9. The method of claim 8 further comprises determining the level in the hierarchy by identifying a lowest level in the hierarchy and using the identified lowest level as the determined level in the hierarchy.

10. The method of claim 7, wherein the hierarchy is implemented as a level-based hierarchy.

11. The method of claim 10 further comprising receiving a selection of a level in the hierarchy from a user of the client device, wherein the selection from the user is used for the determining the level in the hierarchy.

12. The method of claim 7 further comprising generating the measure-based calculated dimension based on a subset of the data stored in the database.

13. A system comprising:
   a set of processing units; and
   a non-transitory machine-readable medium storing instructions that when executed by at least one processing unit in the set of processing units cause the at least one processing unit to:
   receive from a client device a request for data stored in a database in a first table categorized based on a hierarchical dimension, wherein the hierarchical dimension is configured to store values from a plurality of values organized in a hierarchy comprising a plurality of levels specified in a second table, wherein:
      the request includes a measure-based calculated dimension, and
      the measure-based calculated dimension includes member names and value ranges associated with the member names;
   determine a level in the hierarchy based on the request;
   identify records in the first table and the second table based on the determined level in the hierarchy;
   determine first member names for measures of the identified records using the value ranges;
   store the first member names in a third table;
   generate a fourth table by joining first data from the first table and the third table based on the determined level in the hierarchy;
   identify ancestor regions of regions in the fourth table that are in the database using the second table, wherein the ancestor regions are in a level of hierarchy above the determined level in the hierarchy;
   retrieve data from the first table associated with the identified ancestor regions;
   aggregate measures in the fourth table according to the identified ancestor regions;
   determine second member names for the aggregated measures using the value ranges;
   store the second member names and the aggregated measures in a fifth table with second associated hierarchical dimension data;
   generate a sixth table by joining second data from the first table and the fifth table based on the determined level in the hierarchy; and
   provide the sixth table as a result for the request to the client device.

14. The system of claim 13, wherein the hierarchy is implemented as a parent-child hierarchy.

15. The system of claim 14, wherein the instructions further cause the at least one processing unit to determine the level in the hierarchy by identifying a lowest level in the hierarchy and using the identified lowest level as the determined level in the hierarchy.

16. The system of claim 13, wherein the hierarchy is implemented as a level-based hierarchy.

17. The system of claim 16, wherein the instructions further cause the at least one processing unit to receive a selection of a level in the hierarchy from a user of the client device, wherein the selection from the user is used for the determining the level in the hierarchy.

18. The system of claim 13, wherein the instructions further cause the at least one processing unit to generate the measure-based calculated dimension based on a subset of the data stored in the database.

* * * * *